(12) United States Patent
Gomez

(10) Patent No.: US 8,739,422 B2
(45) Date of Patent: *Jun. 3, 2014

(54) PLAN ORIENTATION TEMPLATE

(76) Inventor: Aldo Gomez, Vista, CA (US)

( * ) Notice: Subject to any disclaimer, the term of this patent is extended or adjusted under 35 U.S.C. 154(b) by 62 days.

This patent is subject to a terminal disclaimer.

(21) Appl. No.: 13/341,832

(22) Filed: Dec. 30, 2011

(65) Prior Publication Data

US 2012/0096729 A1  Apr. 26, 2012

Related U.S. Application Data

(63) Continuation of application No. 12/834,814, filed on Jul. 12, 2010, now Pat. No. 8,087,179.

(51) Int. Cl.
*G01B 3/14* (2006.01)

(52) U.S. Cl.
USPC .................... 33/563; 33/1 G; 33/566

(58) Field of Classification Search
USPC ............. 33/1 B, 1 G, 1 K, 121, 562, 563, 566
See application file for complete search history.

(56) References Cited

U.S. PATENT DOCUMENTS

| | | | | |
|---|---|---|---|---|
| 2,545,409 A * | 3/1951 | McCall | ............................ | 33/1 G |
| 4,461,086 A * | 7/1984 | Segletes | ............................ | 33/563 |
| 4,837,939 A * | 6/1989 | Pullen | ............................ | 33/562 |
| 5,842,280 A * | 12/1998 | Robell | ............................ | 33/1 B |
| 2005/0257391 A1* | 11/2005 | Driscoll | ............................ | 33/566 |
| 2008/0078094 A1* | 4/2008 | Baumann | ............................ | 33/566 |
| 2009/0158602 A1* | 6/2009 | Lockyer | ............................ | 33/1 B |
| 2009/0277031 A1* | 11/2009 | Stocking | ............................ | 33/562 |
| 2010/0223798 A1* | 9/2010 | Zimmerman | ............................ | 33/494 |
| 2011/0048186 A1* | 3/2011 | Thomas et al. | ............................ | 33/566 |

* cited by examiner

*Primary Examiner* — G. Bradley Bennett

(74) *Attorney, Agent, or Firm* — Mintz Levin Cohn Ferris Glovsky and Popeo, P.C.

(57) ABSTRACT

A collaboration tool is presented for accurately guiding two or more communicating users to reference common locations in similar but separate architectural drawings. The collaboration tool includes a transparent planar sheet having at least one squared corner, and a grid of squares imposed on at least one side of the transparent sheet. The grid of squares has an X axis and a Y axis originating from the at least one square corner. Each square in the grid of squares is associated with a unique X-axis designator and a unique Y-axis designator. The apparatus further includes an aperture provided within each square of the grid of squares, for allowing a marking instrument therethrough for making a mark at a designated location on an architectural drawing underneath the transparent planar sheet.

6 Claims, 4 Drawing Sheets

PLAN ORIENTATION TEMPLATE

CROSS REFERENCE TO RELATED APPLICATIONS

This application is a continuation and claims the benefit of priority under 35 U.S.C. §120 of U.S. patent application Ser. No. 12/834,814, filed Jul. 12, 2010, now U.S. Pat. No. 8,087,179, entitled "Plan Orientation Template", which the disclosures of the priority applications are incorporated by reference herein.

BACKGROUND

This document relates to architectural drawings, and more particularly to a transparent overlay for architectural drawings of plans, to provide users of such architectural drawings accurate references via the transparent overlay.

In an initial design, architects create architectural drawings to develop, explore, and communicate ideas and solutions. The creation of the architectural drawings involves recording ideas, recognizing functions, and finding new forms and adapting them into an architectural design. Thus, an architectural drawing enables communication between two or more users (e.g. a designer and a foreman). Furthermore, the architectural drawing also helps designers to see and understand the design they work with.

The architectural drawings may be any one of presentation drawings, survey drawings, record drawings, working drawings, drafts by drafters, architectural reprographics, computer aided architectural drawings, sketches and blueprints. An exemplary architectural drawing is shown in FIG. 1.

The architectural drawings may represent a plan, such as a floor plan, a site plan, or other drawing, such as an elevation, isometric and axonometric projections, and detail drawings. The floor plan is a horizontal section cut through a structure (building). The horizontal section cut may show walls, windows, doors, other openings and other features at a particular level of the building. Geometrically, the floor plan is defined as a vertical orthographic projection of an object on a horizontal plane, with the horizontal plane horizontally cutting through the building. The site plan shows the whole context of a building or a group of buildings. It may show the already existing buildings as well as the proposed buildings. Within a site boundary, the site plan presents buildings (if any) already existing and those that are proposed, usually as a building footprint; roads, parking lots, footpaths, hard landscaping, trees and planting. The elevation is a front view of the building i.e. a view of the building seen from a side. The isometric and axonometric projections are simple ways of representing a three dimensional object. Detail drawings characterize a small part of a construction project at a larger scale, and often illustrate how the various components of the architectural drawing fit together.

Often times, the architectural drawings and the sketches need to be altered. The alteration in the architectural drawings includes moving objects in the architectural drawings. FIG. 1 illustrates objects 102, 104, 106 and 108 that need to be identified for a number of reasons: work needs to be performed in proximity of the objects 102, 104, 106. The removal of these objects alters the architectural drawing. In other examples, a wall may need to be moved in the architectural drawing. The movement of the objects may be due to a personal preference, or due to structural design requirements.

However, when the architectural drawings are altered, the alterations need to be communicated to other people in possession with the architectural drawing, and who may not be in geographical proximity to each other. For example, if a particular wall needs to be moved, two or more people viewing identical architectural drawings may need to locate that particular wall accurately. The communication is not easy, as the alterations need to be perceived by the receivers of the alterations in an identical way. Therefore, it is hard to know whether two people looking at separate but identical architectural drawings perceive the location of objects in the architectural drawing in the same way. The first of the two people may be the structural designer, and the second of the two people may be a foreman or any other person. There may be more than two people trying to perceive identical architectural drawings.

Difference in perceptions by different people about identical architectural drawings can lead to unwanted costs and wasted of time. For example, when the suggested alterations by the structural designer are inaccurately perceived by the foreman, unwanted monetary and time loss may occur. The alterations incur materials costs, such as amount location of pipes, etc. The loss may include fines, penalties, wastage of employee time, and additional costs.

Furthermore, at times, the architectural drawings may not have a scale (e.g. linear scale representing how much distance is represented by a fixed unit of distance on the architectural drawing) displayed with the architectural drawing, even if the architectural drawings are made according to scale. Communication of alterations on such architectural drawings can lead to further communication errors.

The alterations need to be specified specifically with respect to a reference point. The reference point may be changed as per the convenience of the people using the architectural drawing. During the communication, a fixed reference point and the specific alterations need to be communicated to ensure collaboration between the different parties involved with creating and using the altered architectural drawing. The specific alterations may include the specific coordinates of the alteration. Examples of specific alterations are illustrated by objects 102, 104, 106 and 108 in FIG. 1. Therefore, there is a need to have a grid on a transparent overlay to accurately represent where the alterations are made or need to be made-on the architectural drawing.

SUMMARY

This document describes a collaboration tool for accurately guiding two or more communicating users to reference common locations in similar but separate architectural drawings.

In one aspect, an apparatus is disclosed. The apparatus includes a transparent planar sheet having at least one squared corner, and a grid of squares imposed on at least one side of the transparent sheet. The grid of squares has an X axis and a Y axis originating from the at least one square corner, and each square in the grid of squares is associated with a unique X-axis designator and a unique Y-axis designator. The apparatus further includes an aperture provided within each square of the grid of squares. In a preferred implementation, each aperture has an internal diameter of 0.5 to 1.5 mm.

In another aspect, an apparatus includes a transparent planar sheet having at least one squared corner, and a grid imposed on at least one side of the transparent sheet. The grid has an X axis and a Y axis, both axes originating from the at least one square corner. Each square in the grid is associated with a unique X-axis designator and a unique Y-axis designator. The apparatus further includes a ruler imposed on the transparent sheet for providing a linear scale, and a number of apertures, each aperture provided in a center of at least a portion of the squares of the grid. The apparatus further includes a template section provided in an area of the transparent sheet, the template section providing a plurality of templates of geometrical shapes.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
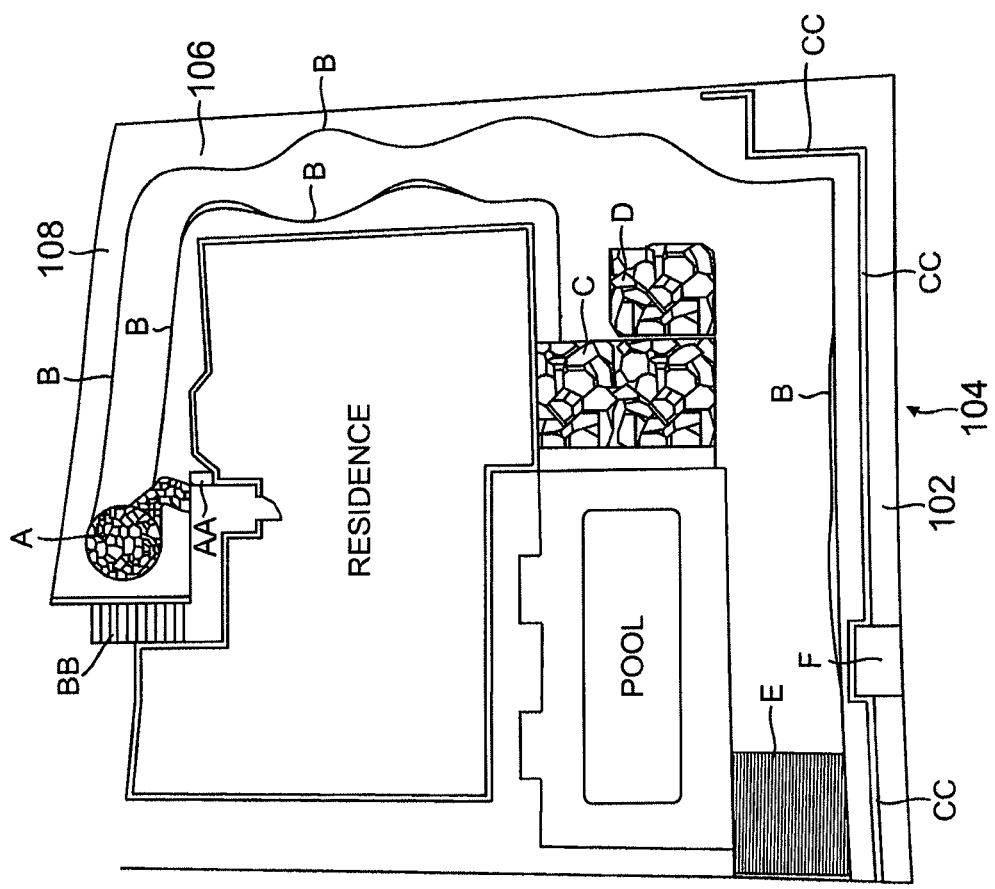
FIG. 1 illustrates an architectural drawing with alterations.
Figure 2:
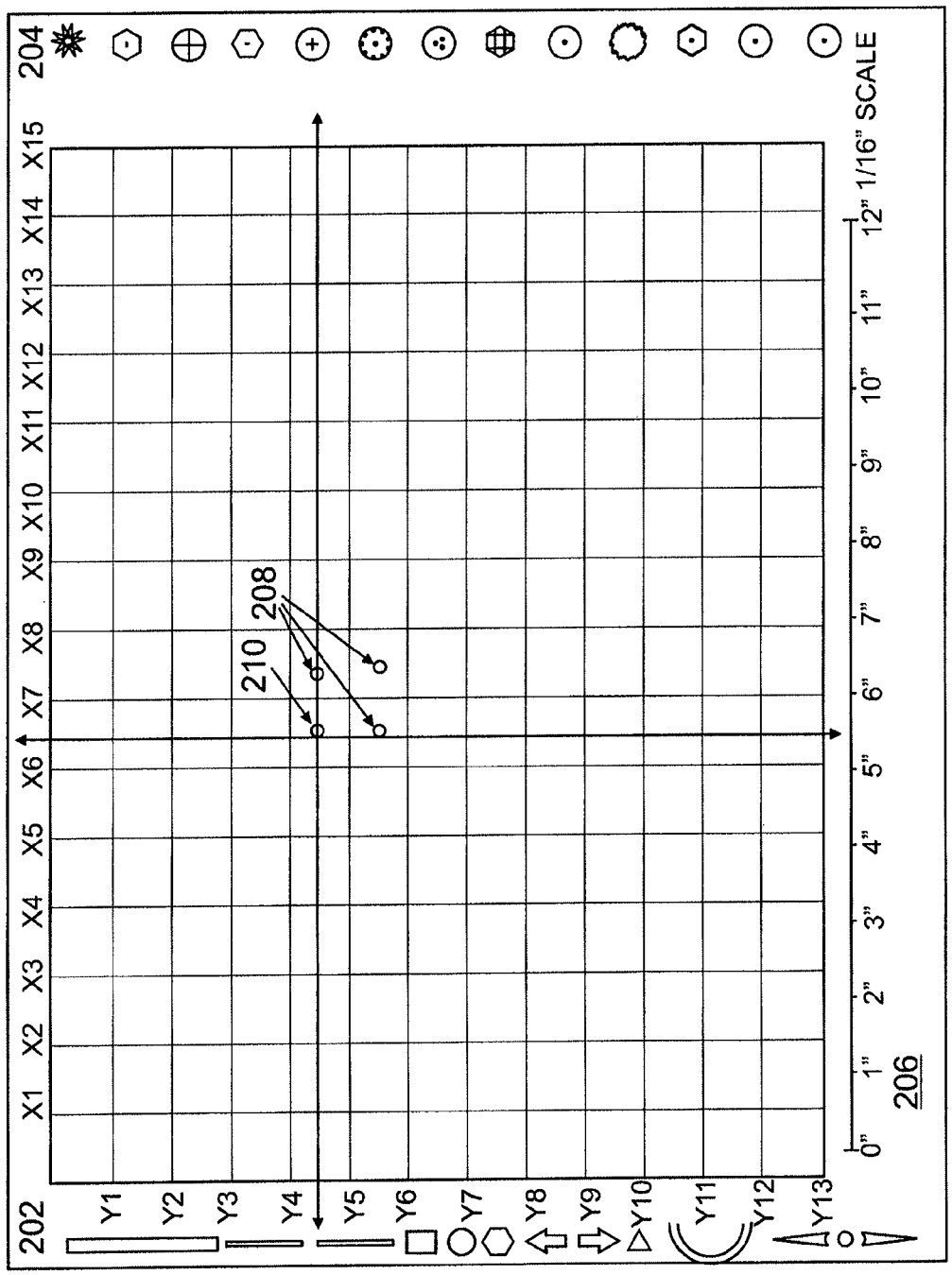
FIG. 2 illustrates a transparent planar sheet.

This document describes a transparent overlay for architectural drawings. FIG. 2 illustrates a transparent overlay 200. The transparent overlay includes a transparent planar sheet 202 having at least one squared corner, and a grid 203 printed on at least one side of the transparent sheet. The grid 203 has an X-axis and a Y-axis, each originated from or near the at least one squared corner and each being segmented, preferably in uniform increments, to provide a coordinate grid of squares, where each segment is associated with a unique designator. Accordingly, each square of the coordinate grid is associated with a unique X-axis designator and a unique Y-axis designator.

The transparent planar sheet further includes a plurality of apertures 204, 208 and 210. One set of apertures may be a set of template shapes 204, like geometrical shapes such as squares, circles, triangles, and the like, or representations of architectural features such as landscape elements (trees, shrubs, etc.), walls, or other features. Another set of apertures 208 includes an aperture provided in a center of at least a portion of the squares of the grid. This other set of apertures can be 0.5 to 4 millimeters in diameter, and preferably sized to accept a pen or pencil point through the aperture to be able to contact and mark any underlying architectural drawing at the location of the desired aperture. Each of the apertures 208 in the squares is likewise identifiable by an associated X and Y designator.

In use, the transparent planar sheet, and hence the grid, is overlaid on the architectural drawing. The transparent planar sheet, and hence the grid, can be moved around on the architectural drawing to accurately reference a location on the architectural drawing.

The transparent planar sheet can be rolled for carrying. The transparent planar sheer made of transparent, flexible material, such as acetal, acrylic, fluoropolymer, nylon, phenolic, polycarbonate, polyethylene, polypropylene, polysyrene, polyvinyl chloride (PVC), or other thermoplastic polymer. In some implementations, the transparent planar sheet is made of clear transparent heavy duty vinyl. The transparent planar sheet can be less than 1 mm in thickness, or up to 5 mm thick or more. The thickness of the transparent planar sheet can be determined based on a desired weight of the transparent overlay, i.e. in some instances it is desirable for the transparent planar sheet to act as a "paper weight" for the underlying architectural drawing.

The transparent planar sheet has a coordinate system depicted or printed on at least one side of the transparent plastic sheet. The coordinate system comprises a grid of squares formed of two axes which are marked according to a linear scale. The linear scale represents a distance represented by a fixed unit of distance on the transparent planar sheet. The two axes are perpendicular to each other. The two perpendicular axes are denoted as X axis and Y axis. The different coordinates on the axes are represented in an increasing order. For example, the X axis coordinates are X1, X2, X3, X4, and so on. The distance between two X axis coordinates that occur next to each other on the plastic sheet is the same throughout. Similarly, the Y axis coordinates are Y1, Y2, Y3, Y4, and so on. The distance between two Y axis coordinates that occur next to each other on the transparent planar sheet is the same throughout.

A grid is created by thin lines perpendicular to both the axes. The thin lines start at the steps X1, X2, X3, X4, and so on, as well as Y2, Y3, Y4, and so on. In some preferred exemplary implementations, the distance between increments of either coordinate is 1 inch, and therefore, each grid square formed by the grid is a 1 inch×1 inch square. In other implementations, the dimensions of each square in the grid may vary.

A linear scale is used to represent distance represented by a fixed unit of distance on the transparent planar sheet. For example, each inch on the transparent planar sheet may represent 1 meter, or any other value. A ruler 206 that is disposed adjacent to the grid of squares provides the scale. The ruler 206 is shown along the edge of the transparent planar sheet, or may be integrated with the grid. In another implementation, a logarithmic scale or an exponential scale may be used, if required. The linear scale is the same as a scale with which the architectural drawing has been created.

It is noted that the use of the linear scale may not be necessary if two or more people communicating with each other are using identical architectural drawings. The two or more people can, via the transparent planar sheet, determine a reference point and coordinates of a location (on the architectural drawing) being discussed. The reference point on the transparent planar sheet defines a reference on the architectural drawing from where an object is referenced. The coordinates of the location are noted using the grid on the transparent planar sheet. The location refers to a location of the object.

As noted earlier, the grid is formed of lines that intersect at right angles to form squares. A rough estimate may be taken for the location of a point that lies inside any given square. To avoid rough estimates, when accuracy is desired, the grid may comprise of more detailed incremement markings associated with the square, such as on the lines bordering the square, or within the square itself. A suitable reference point can be selected to ensure that the point, whose accurate position is required, is placed within a square displaying the more detailed markings. This enables an accurate estimate, wherever required.

As shown in FIG. 2, the transparent planar sheet can include a number of apertures 208, with at least one aperture 208 provided within at least some of the squares formed by the grid. Each aperture 208 is located in a common region of each square, such as in the center. The apertures 208 enable a user to mark the architectural drawing underlying the plastic sheet, without lifting or moving the plastic sheet, on. The aperture is preferably small i.e. less than 1/16 inch in diameter.

In other implementations, the diameter of the aperture may be less than ¼ inch. The diameter of the aperture is kept sufficient to allow marking with a 0.9 mm pencil.

Figure 3:
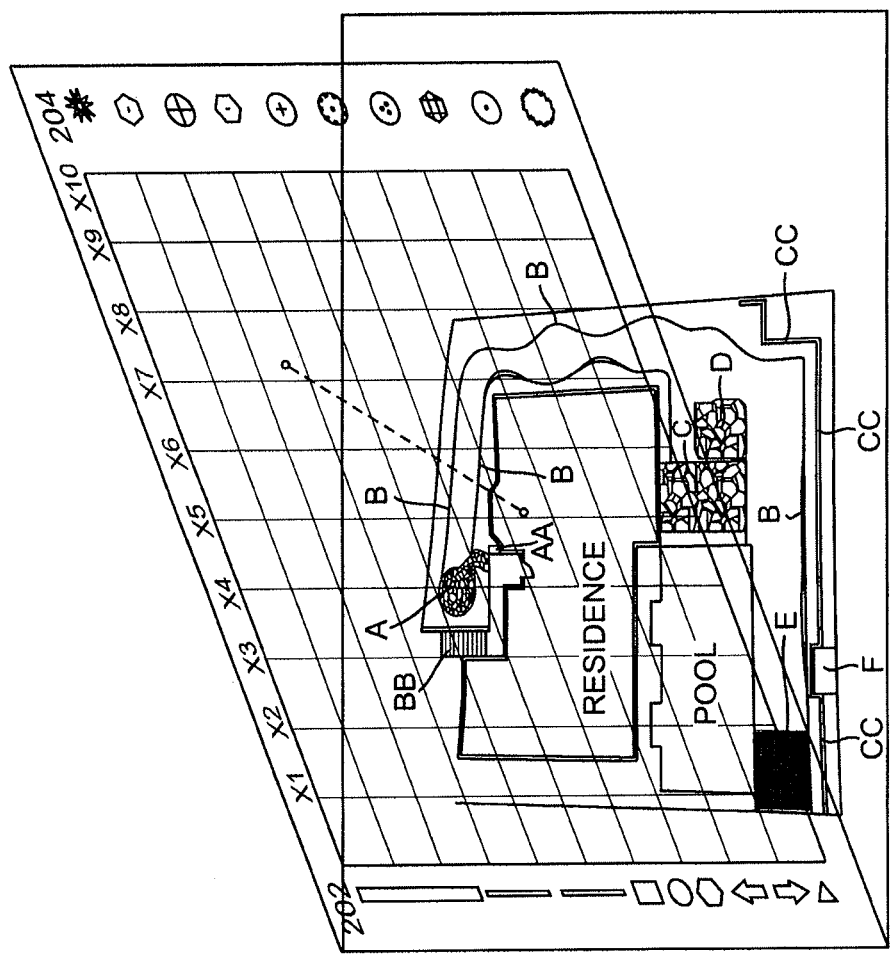
FIG. 3 illustrates how the transparent planar sheet is mapped and put over the architectural drawing.

FIG. 3 illustrates how the transparent planar sheet is mapped and put over the underlying architectural drawing. A desired focal point on the sheet is placed on a desired point on the underlying architectural drawing, as shown by the dotted line in FIG. 3.

Figure 4:
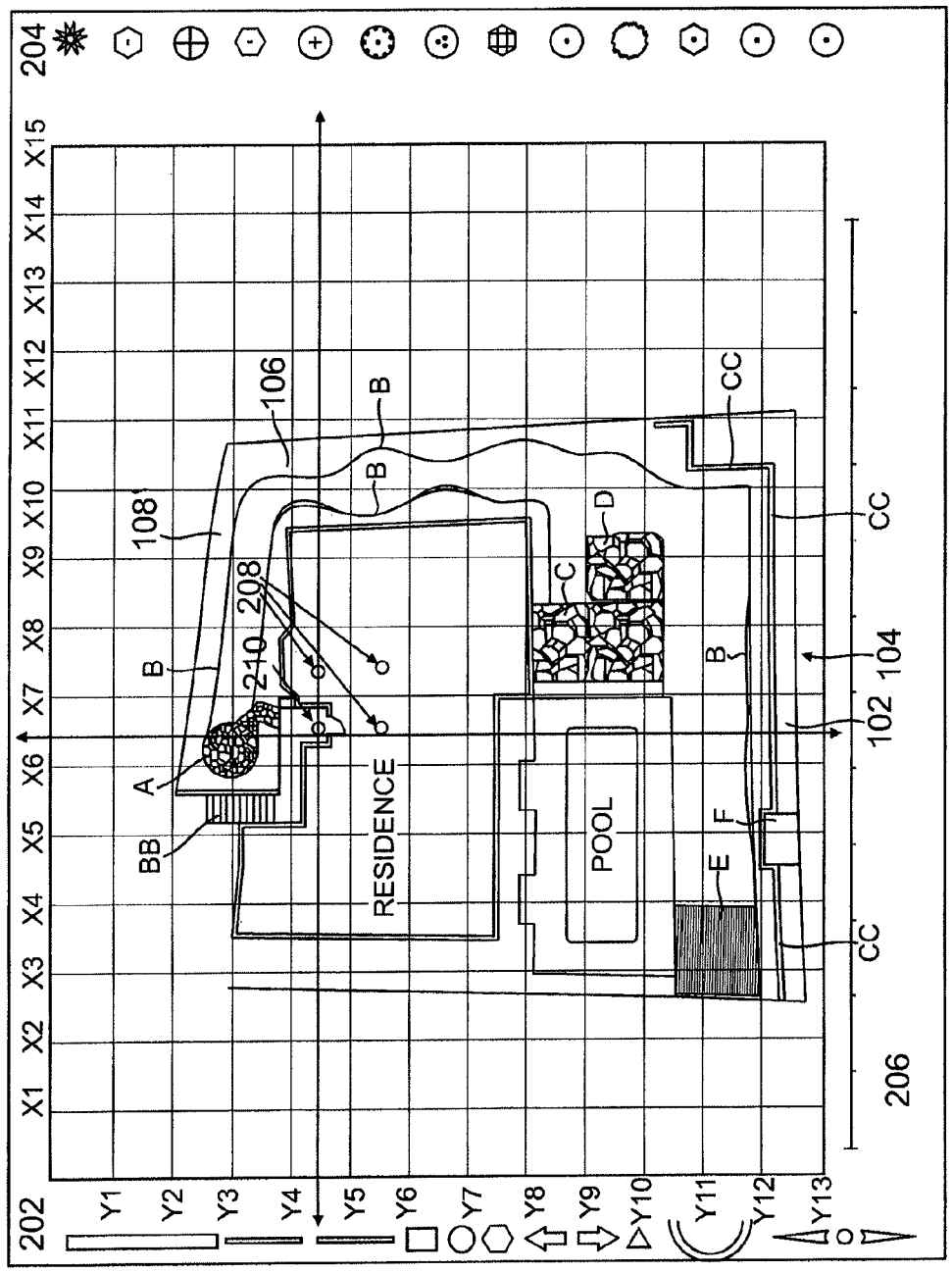
FIG. 4 illustrates the transparent planar sheet put over the underlying architectural drawing.

A reference point, from where an object is referenced, can be selected anywhere on the architectural drawing. The focal point 210 may be selected as the reference point. FIG. 4 illustrates the transparent planar sheet overlaid on the architectural drawing. An object within the architectural drawing can be identified, and its location verified, by location within the grid and association of the designators in the grid.

The transparent planar sheet can also include templates. The templates can be of geometrical shapes (squares, triangles, circles, ellipses, etc) are provided along one side, multiple sides, or at any area within the transparent sheet. The templates can also include architectural shapes (trees, shrubs, structures, etc.). The geometrical shapes make the markings more accurate. The different objects may be represented by corresponding different geometrical shapes. For example, different plants disclosed in the architectural drawing may be represented by different geometrical or architectural shapes.

One or more squares can be used to accurately estimate the area enclosed by those squares. The area enclosed can be marked on the plastic sheet by a dry-erase marker or other transient marker used by a user. Based on the marking, the square footage size is calculated. The transient marks can be made on the template on-site, and then brought back to the office for overlay on a copy of the architectural drawings for tasks including area estimation and plan revisions.

The transparent sheet can also include a boundary that is printed or otherwise provided to at least a part of a peripheral region of the transparent sheet, and can enclose all or some of the grid, templates, ruler or other components of the apparatus.

Although a few embodiments have been described in detail above, other modifications are possible. Other embodiments may be within the scope of the following claims.

The invention claimed is:

1. An apparatus comprising:
   a transparent planar sheet;
   a grid of squares imposed on at least one side of the transparent sheet, the grid Of squares having an X axis and a Y axis, each square in the grid of squares being associated with a unique X-axis designator and a unique Y-axis designator; and
   an aperture provided within each square of the grid of squares.

2. The apparatus in accordance with claim 1, further comprising a template section provided in transparent sheet adjacent to the grid of squares, the template section having a plurality of traceable shapes.

3. The apparatus in accordance with claim 2, further comprising a ruler imposed on the transparent sheet adjacent to the grid of squares for providing a linear scale.

4. The apparatus in accordance with claim 1, further comprising at least one first line perpendicular to the X-axis and at least one second line perpendicular to the Y-axis, the intersection of the first line and the second line defining a focal point.

5. The apparatus in accordance with claim 2, wherein the traceable shapes include landscape elements.

6. The apparatus in accordance with claim 1, wherein the transparent planar sheet is made of vinyl.

* * * * *